US006378191B1

(12) United States Patent
County

(10) Patent No.: US 6,378,191 B1
(45) Date of Patent: Apr. 30, 2002

(54) METHOD AND APPARATUS FOR HANGING DOORS

(76) Inventor: James County, 22 1st St., Yonkers, NY (US) 10704

(*) Notice: Subject to any disclaimer, the term of this patent is extended or adjusted under 35 U.S.C. 154(b) by 0 days.

(21) Appl. No.: 09/449,777

(22) Filed: Nov. 26, 1999

(51) Int. Cl.[7] .................................................. B23P 11/00
(52) U.S. Cl. ............................ 29/434; 269/904; 29/267
(58) Field of Search .......................... 254/131; 269/133, 269/904; 29/267, 434; 52/745.14, 745.15, 745.16

(56) References Cited

U.S. PATENT DOCUMENTS 604,833 A * 5/1898 Muller
671,554 A * 4/1901 Heisler
1,681,834 A * 8/1928 Arends
1,753,480 A * 4/1930 Rocholl
3,807,720 A * 4/1974 Converse et al. ....... 269/904 X
3,871,054 A * 3/1975 Schaefer
4,010,931 A * 3/1977 Wheeler
4,492,369 A * 1/1985 Pohl
5,048,806 A * 9/1991 Peutsuh et al.
5,529,287 A * 6/1996 Pelosi et al.
6,022,008 A * 2/2000 Bachman
6,079,696 A * 6/2000 Bette

* cited by examiner

*Primary Examiner*—David P. Bryant
*Assistant Examiner*—Steve Blount
(74) *Attorney, Agent, or Firm*—Richard B. Klar

(57) ABSTRACT

The present invention relates to a door jack formed of a lever arm having a first end formed as a foot pedal and a second end connected by a hinge or universal joint to a doorholder. In between the two ends of the lever arm a pivotal piece acting is located on the underside of the lever arm. When a workperson places his foot on the foot pedal and thus presses down the door holder in which the door 14 is contained lifts upward causing the door to be lifted vertically to any desired height. By moving the pedal in the horizontal plane, e.g. parallel to the floor the door will move in the horizontal plane in the opposite direction of the direction of the foot pedal due to the articulating member, e.g. the hinge or the universal joint. This causes the door to aligned in place.

15 Claims, 5 Drawing Sheets

METHOD AND APPARATUS FOR HANGING DOORS

BACKGROUND OF THE INVENTION

1. Field of the Invention

The present invention relates to a method and an apparatus for hanging doors. In particular, the present invention relates to a safe and efficient method and an apparatus solely for the purposes of hanging doors.

2. The Prior Art

As every workperson knows, the present method today of hanging a door involves one person lifting the door manually while the other work person aligns the hinges and inserts the hinge screws. For a heavy door this task requires at least two work people using all kinds of material and tools to lift the door and keep it in place while the screws are inserted. This task requires workpeople to look for screwdrivers, handles of hammers, wooden wedges and the like. The manpower, time consumption and physical exertion are costly, inefficient and can lead to injury to the workpeople. The present invention provides for a new apparatus; a door jack that eliminates all the aforementioned problems and enables one workperson to install a door with minimum effort.

Apparatuses for lifting doors and other objects into a correct position are known in the art. Such prior art references include U.S. Pat. Nos. 1,288,882; 1,890,966; 2,551,483; 3,642,251; 3,871,054; and 5,225,288. None of the inventions disclosed in these references are of practical use in hanging doors and that is why no such tool is known to be on the market today.

It is therefore desirable to provide a method and an apparatus that is safer, more efficient, portable and simple to use for hanging a door.

SUMMARY OF THE INVENTION

It is therefore a principal object of the invention to provide a method and an apparatus that is safe and efficient for hanging doors.

It is yet another object to provide a method and an apparatus that is portable and easy to use and requires only one person to use it in order to hang a door with minimum effort.

It is still another object of the invention to provide a method and apparatus for hanging doors that eliminates manpower, reduces cost associated with manpower and reduces the risk of injury to a worker installing a door with present invention.

It is yet another object to provide a method and apparatus that permits a door to be moved in the vertical and horizontal planes for hanging the door in the correct position.

It is still another object of the present invention to provide a method and an apparatus which is adjustable for doors of different thicknesses.

Other objects of the present invention will become apparent from the foregoing description and accompanying drawings in which:

DETAILED DESCRIPTION OF THE PREFERRED EMBODIMENTS

Figure 2:
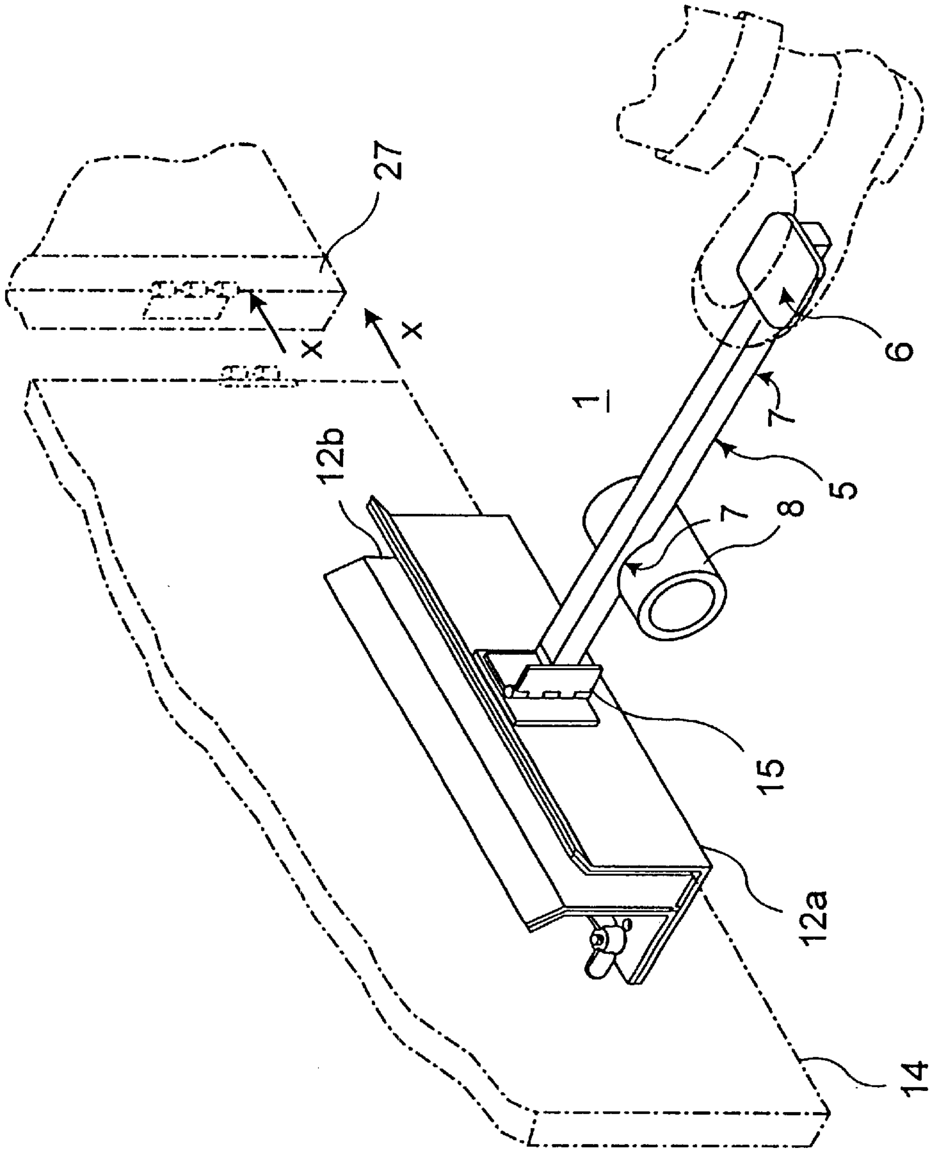
FIG. 2 is a perspective view of the embodiment of the present invention of FIG. 1.
Figure 1:
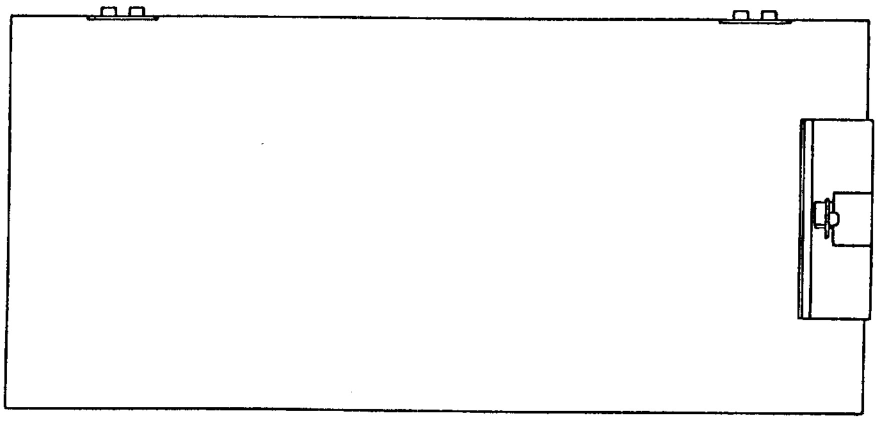
FIG. 1 is a plan view of a first embodiment of the present invention showing a portion of the invention engaging a door.

Referring now to the drawings of FIGS. 1–8 and in particular to FIGS. 1 and 2 in which a first embodiment of the present invention is shown comprising a door jack 1 formed of a lever arm 5 having a first end 6 preferably formed as a foot pedal 6 where a workperson can place his foot on and thus press down thereby raising elements **12*a* and 12*b* of the door holder or bracing structure 12 in which the door 14 is contained causing the door to be lifted vertically to any height desired, preferably from ⅛" to 1½" off the ground. Most doors when hanging are from ¼" to ¾" from the floor. The foot pedal 6 is preferably approximately 3" by 3". The lever arm 5** is preferably 15" long and is preferably formed of flat steel measuring preferably ¼" by 1" with the 1" side facing vertically for strength purposes.

Figure 7:
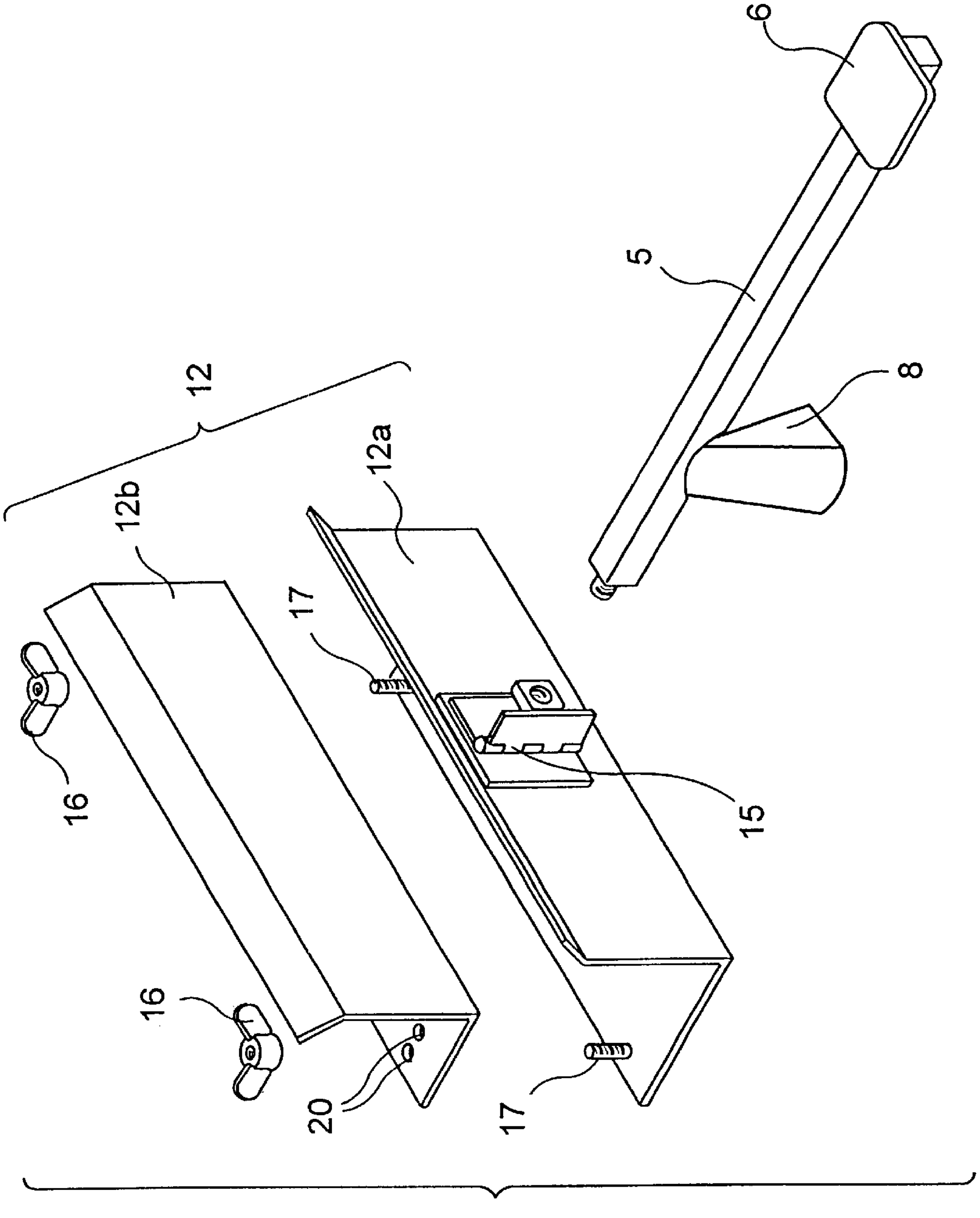
FIG. 7 is a perspective view of a second embodiment of the present invention in which the pivotal piece is triangularly shaped.

A fulcrum or pivotal piece 8 is located between the foot pedal 6 and the door holder 12 and preferably approximately 12" from the foot pedal 6 and 4" from the door holder 12 thus providing a work person with a leverage ratio of 3 to 1. This arrangement would enable an average person to lift a door with minimum effort. The pivotal piece is preferably 2½" high and comprises ¼" thick steel plate welded to the underside 7 of the lever arm 5. The pivotal piece is preferably formed triangular shaped having a flat apex with the flat apex top surface wielded to the underside of the lever arm 5 as shown in FIG. 7 The pivotal piece is not limited to any particular geometrical shape.

The lever arm 5 has a second end 11 having a threaded end 11. The threaded end is connected to a hinge mechanism 15. The threaded end serves two purposes: First, it enables the invention to be disassembled into two parts so that it fits easily into a tool box; and second it also permits the door when lifted to be moved to the left or the right at the top of the door so as to align the hinges of the door.

The hinge mechanism 15 is a regular hinge preferably with a 3 "×3" plate welded to the L shaped plate **12*a* of the door holder 12, The outside of the hinge 15 contains a thread section such as a ¾" nut enabling a work person to screw the threaded end of the lever arm 5 to the door holder 12 and door components 12*a* and 12*b***.

Figure 8:
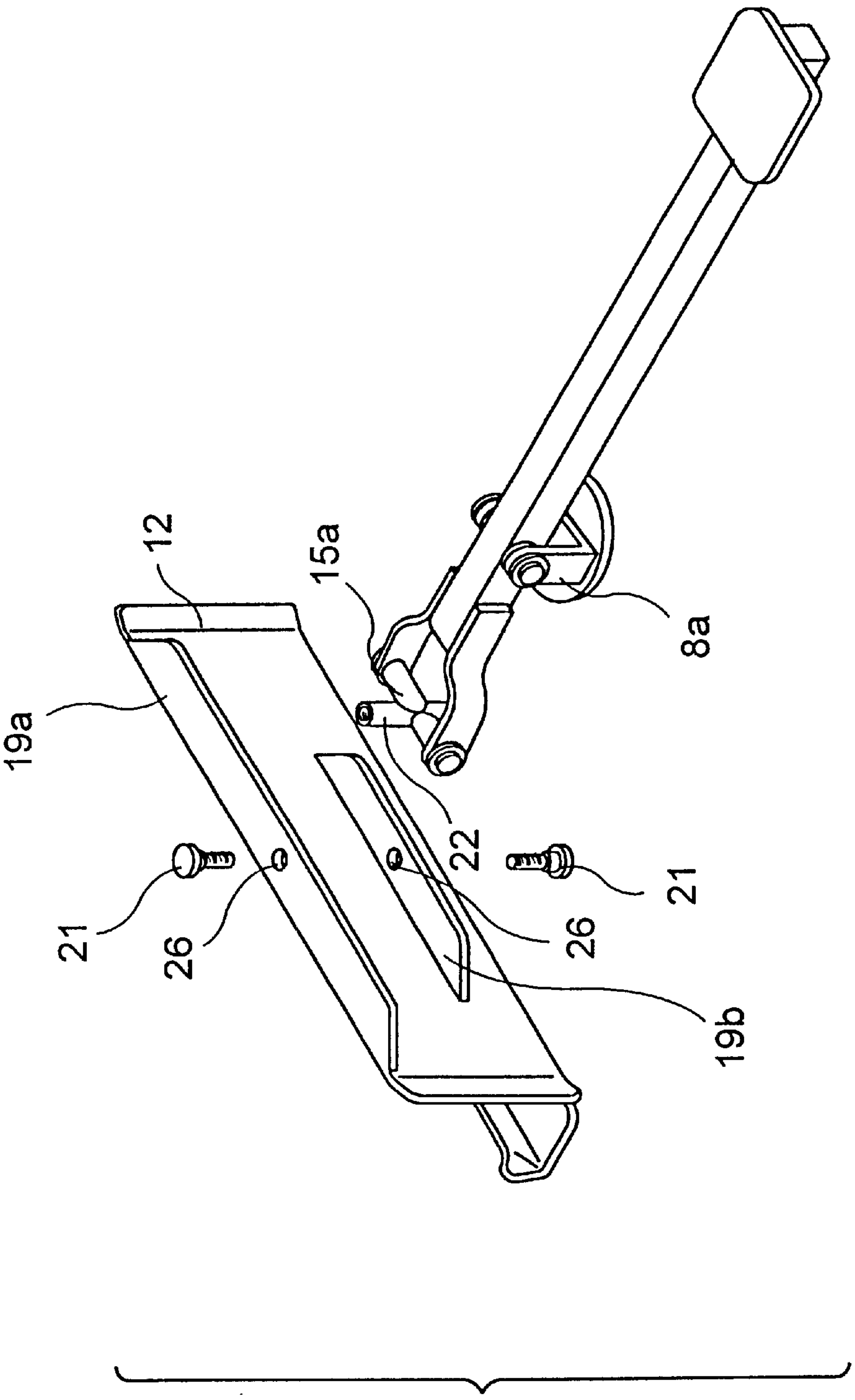
FIG. 8 is a partially exploded view of a third embodiment of the present invention.

The hinge mechanism can be any suitable hinge known and includes but is not limited to a door hinge. Preferably the hinge mechanism can be custom made with a plate welded to the component **12*a* of the door holder 12 and including a hinge having a vertical axis about which the hinge is rotated. Alternatively, the hinge mechanism as shown in FIG. 8 is a universal joint 15**a.

This hinge 15 serves an important role in the present invention since when a workperson hangs a door and puts the door within 1" of the door frame, after lifting the door to the correct height with the foot pedal 6, the workperson can move his foot to the left or right a couple of inches by moving the foot pedal 6 accordingly. If the foot pedal 6 is moved a certain distance to the left then the door is moved the same distance to the right. By virtue of the hinge 15 maintaining the door in alignmenet with the door frame, thus moving the door so that it fits perfectly in place. The hinge 15 maintains the door in the same line of axis as the door frame 27 to which the door is to be hinged. If not for the hinge 15 the door would swing out of alignment with the door post. This frame of reference x can be seen in FIG. 2.

Figure 3:
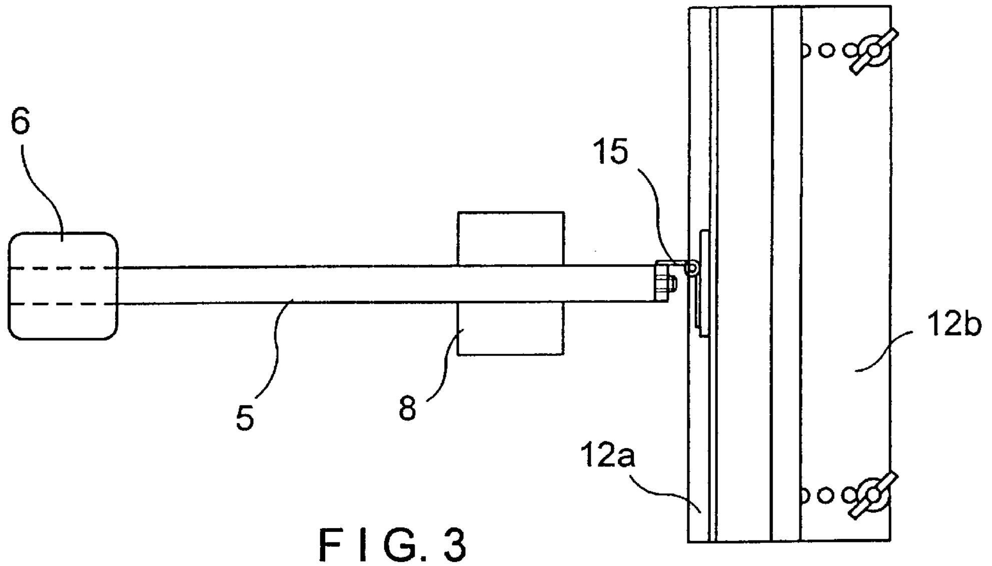
FIG. 3 is a top view of the embodiment in FIG. 2.
Figure 4:
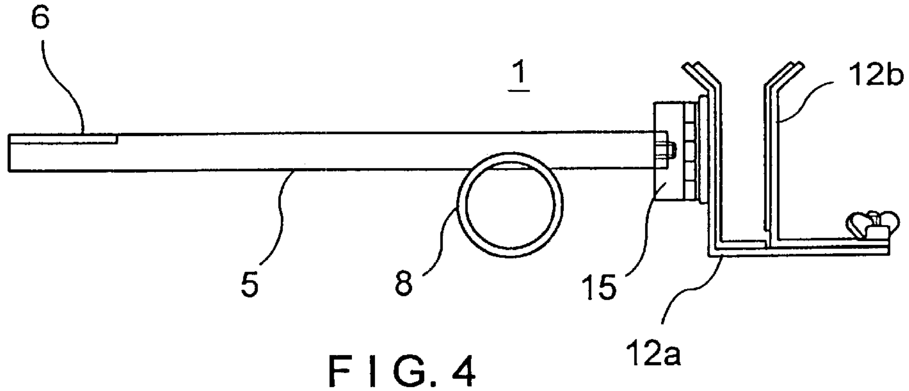
FIG. 4 is a side view of FIG. 2 showing how the door holder or bracketing structure is adjustable for the thickness of the door.
Figure 5:
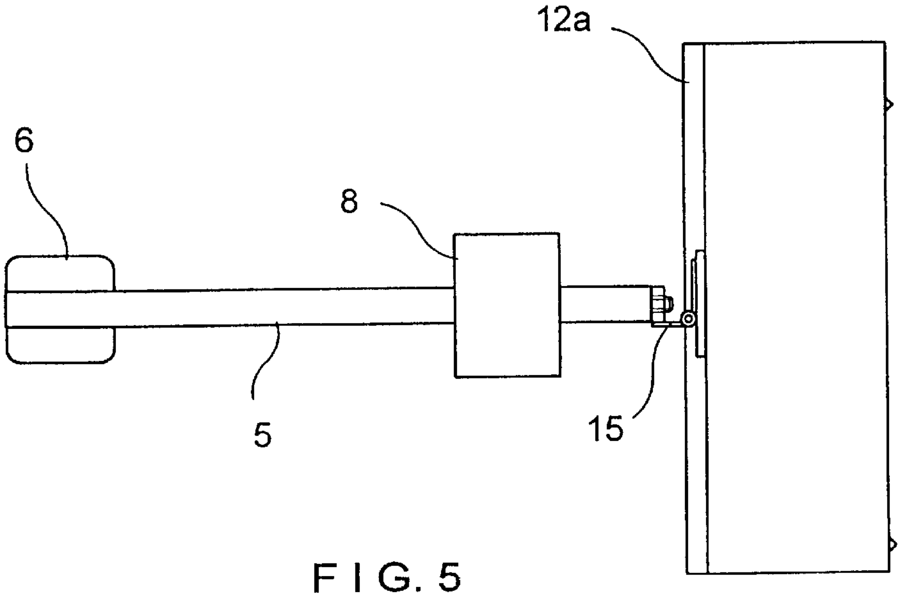
FIG. 5 is a bottom view of FIG. 2.

FIGS. 3–5 show the fulcrum or pivotal piece shaped as a cylinder connected with the lever arm 5 and door holder.

Figure 6:
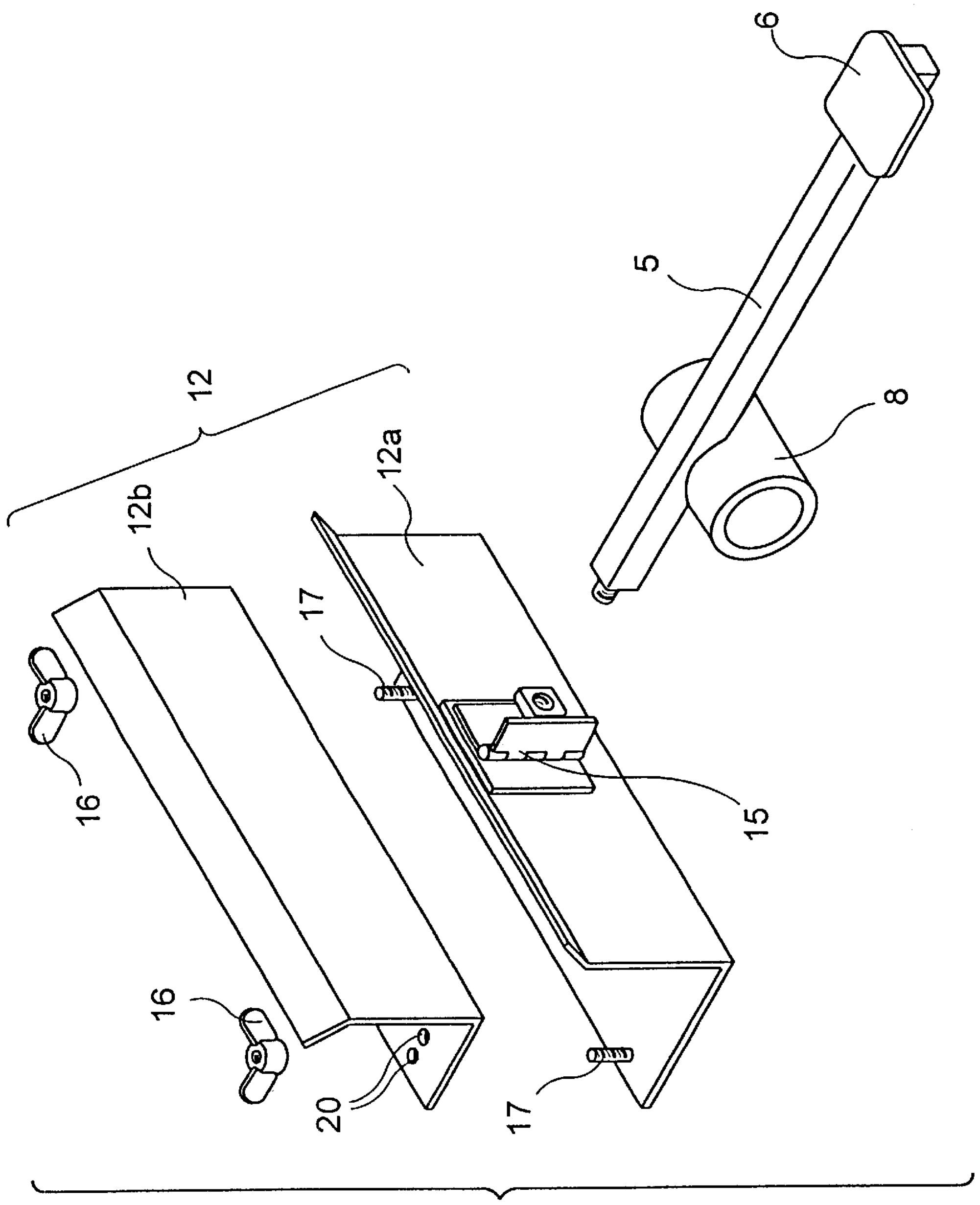
FIG. 6 is a partially exploded perspective view of FIG. 2.

FIG. 6 illustrates how the two components 12a and 12b of the door holder are adjustable. The door holder is preferably formed as an L-shaped plate 12a which contains the hinge 15 at its back and two threaded bolts 17 to receive the other component 12b of the door holder 12. Preferably the dimensions of the door holder 12 are 5½" vertically and 5" horizontally. The second component 12b of the door holder 12 sits on top of the first component plate 12a and is secured preferably by butterfly wing nuts 16 to the bolts 17 on component 12a as shown in FIG. 6. The second component can be moved and secured in place to any of the pairs of hole 20 by the bolts and butterfly wing nuts depending on the thickness of the door and thus the desired distance between the two components 12a and 12b. Preferably the first and second plates, components 12a and 12b, each contain padding to protect the door from the plates and both plates are preferably formed of 3/16" steel or aluminum in addition to the padding.

FIG. 8 shows another embodiment of the present invention which works substantially as the first embodiment in terms of its vertical plane and horizontal plane movement in operation of the door jack 1. Instead of the hinge mechanism 15 of the first embodiment a universal joint 15a is used. A pivotal piece 8a is an articulated unit 8a formed a swivel unit with a shaft through the sides of the lever arm as shown in FIG.7 and replaces pivot piece 8. The universal joint has vertical shaft piece 22 which is received between holes 26 in each of the two edges 19a and 19b of the door holder 12. Screws 21 secure the vertical shaft piece 22 in place. Although the doorholder shown in FIG. 8 is a one component doorholder, the invention is not limited to this construction of the doorholder and preferably the doorholder is formed of two components to sandwich and better hold a door during lifting as the doorholder shown in FIGS. 1–7 of the drawings.

I do not limit myself to any particular details of construction set forth in the specification and illustrated in the accompanying drawings, as the same refers to and sets forth only certain embodiments of the invention, and it is observed that the same may be modified without departing from the spirit and scope of the claimed invention.

Having thus described the invention, what is claimed as new and desired to be secured by Letters Patent is as follows:

1. An apparatus for hanging doors, comprising:

a door holder formed of at least one component to accommodate doors therein;

a lever arm having a first end adapted to receive weight thereon and a second end hingedly connected to said door holder;

a pivotal piece connected to said underside of said lever arm so that when said first end of said lever arm receives weight thereon causing said second end of said lever arm, said door holder and any door contained within said door holder to be lifted upward; and a hinge mechanism for hingedly connecting said second end of said lever arm to said door holder so that when said first end is moved to the left a certain distance causing the second end of the lever arm, the door holder and any door contained therein to be moved to the right said certain distance and when said first end is moved to the right a certain distance causing said second end, said door holder and any door contained therein to be moved to the left said certain distance, said hinge mechanism maintaining said door holder and any door contained therein in alignment for positioning a door so that a door can be aligned vertically and horizontally.

2. The apparatus of claim 1 wherein said first end is formed as a foot pedal.

3. The apparatus of claim 1 wherein said hinge mechanism is a door hinge.

4. The apparatus according to claim 1 wherein said lever arm has an underside and said pivot piece is welded at its top portion to said underside of said lever arm.

5. The apparatus according to claim 1 wherein said hinge mechanism is a universal joint.

6. The apparatus according to claim 1 wherein said pivotal piece is triangularly shaped.

7. The apparatus according to claim 1 wherein said door holder is padded to provide protection for a door contained therein.

8. The apparatus according to claim 1 wherein said hinge mechanism is a regular hinge including a plate welded to a portion of said doorholder.

9. The apparatus according to claim 8 wherein one of the two components of said doorholder is L shaped and said plate of said hinge mechanism is welded to said one component of said doorholder.

10. The apparatus according to claim 1 wherein said at least one component of said door holder includes at least two components and is adjustable between said two components to accommodate doors of different thickness between said two components.

11. The apparatus according to claim 1 wherein said at least one component of said door holder is L-shaped.

12. A method for hanging doors, comprising;

holding a door with a door holder formed of at least one component to accommodate doors therein; and lifting and positioning a door with a lever arm having an underside, a first end adapted to receive weight thereon and a second end hingedly connected to said door holder; a pivotal piece connected to said underside of said lever arm so that when said first end of said lever arm receives weight thereon said second end of said lever arm, said door holder and any door contained within said door holder is lifted upward; and a hinge mechanism for hingedly connecting said second end of said lever arm to said door holder so that when said first end is moved to the left a certain distance it causes the second end of the lever arm, the door holder and any door contained therein to be moved to the right said certain distance and when said first end is moved to the right a certain distance it causes said second end, said door holder and any door contained therein to be moved to the left said certain distance and said door holder and a door contained therein will be maintained in alignment by said hinge mechanism and not pivot out of alignment with a door frame, said door frame being adapted to have a door hinged therein, so that said door can be aligned vertically and horizontally.

13. The method according to claim 10 wherein said at least one component of said door holder includes at least two components and is adjustable between said two components and accommodates doors of different thickness between said two components.

14. The method according to claim 10 wherein said at least one component of said door holder is connected to said door holder.

15. The method according to claim 10 wherein said at least one component of said door holder is L-shaped.

* * * * *